June 5, 1956 H. B. ABER 2,748,680
POWER LIFTS
Filed March 22, 1951 2 Sheets-Sheet 1
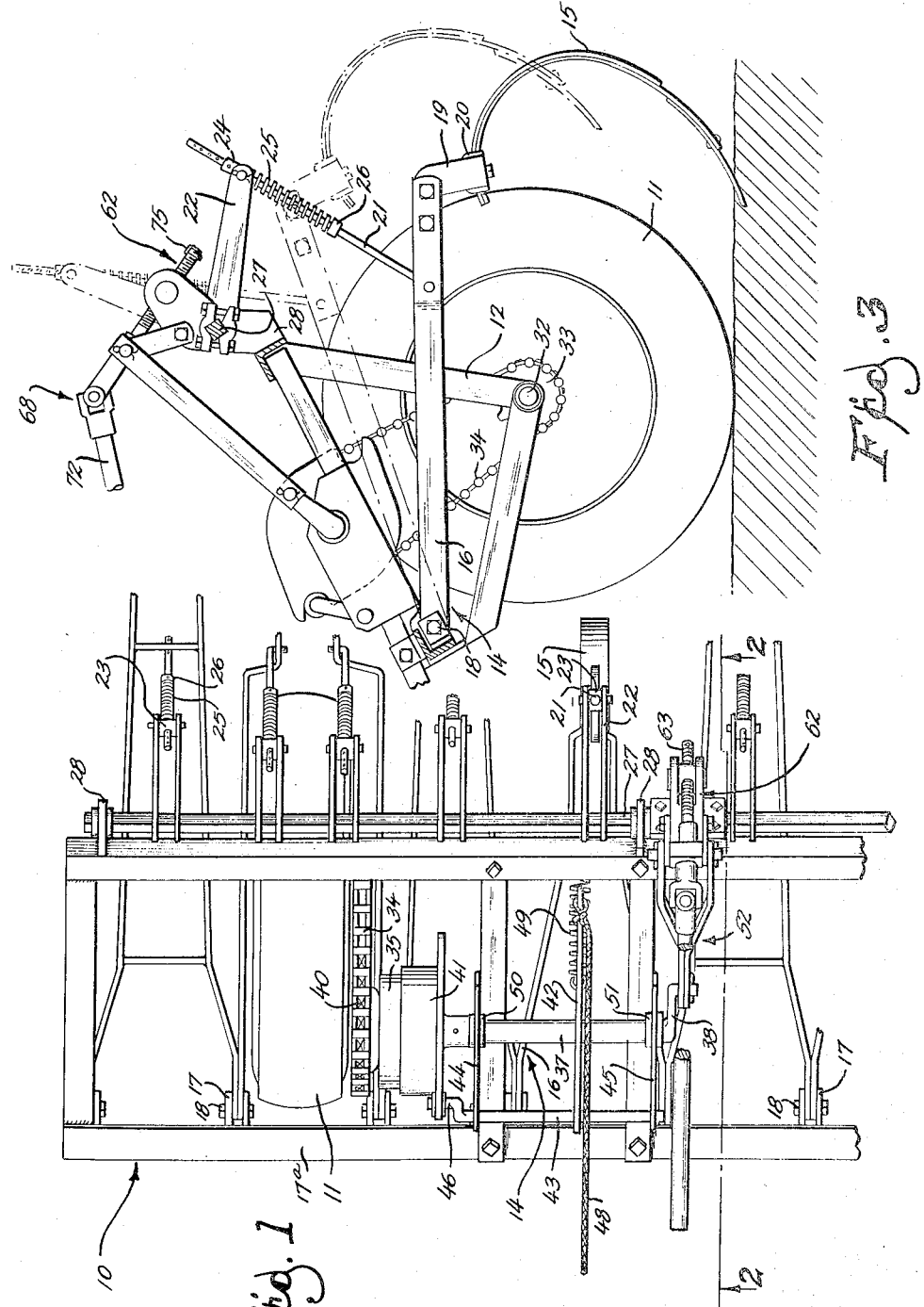
Inventor
HOMER B. ABER
By
Attorney

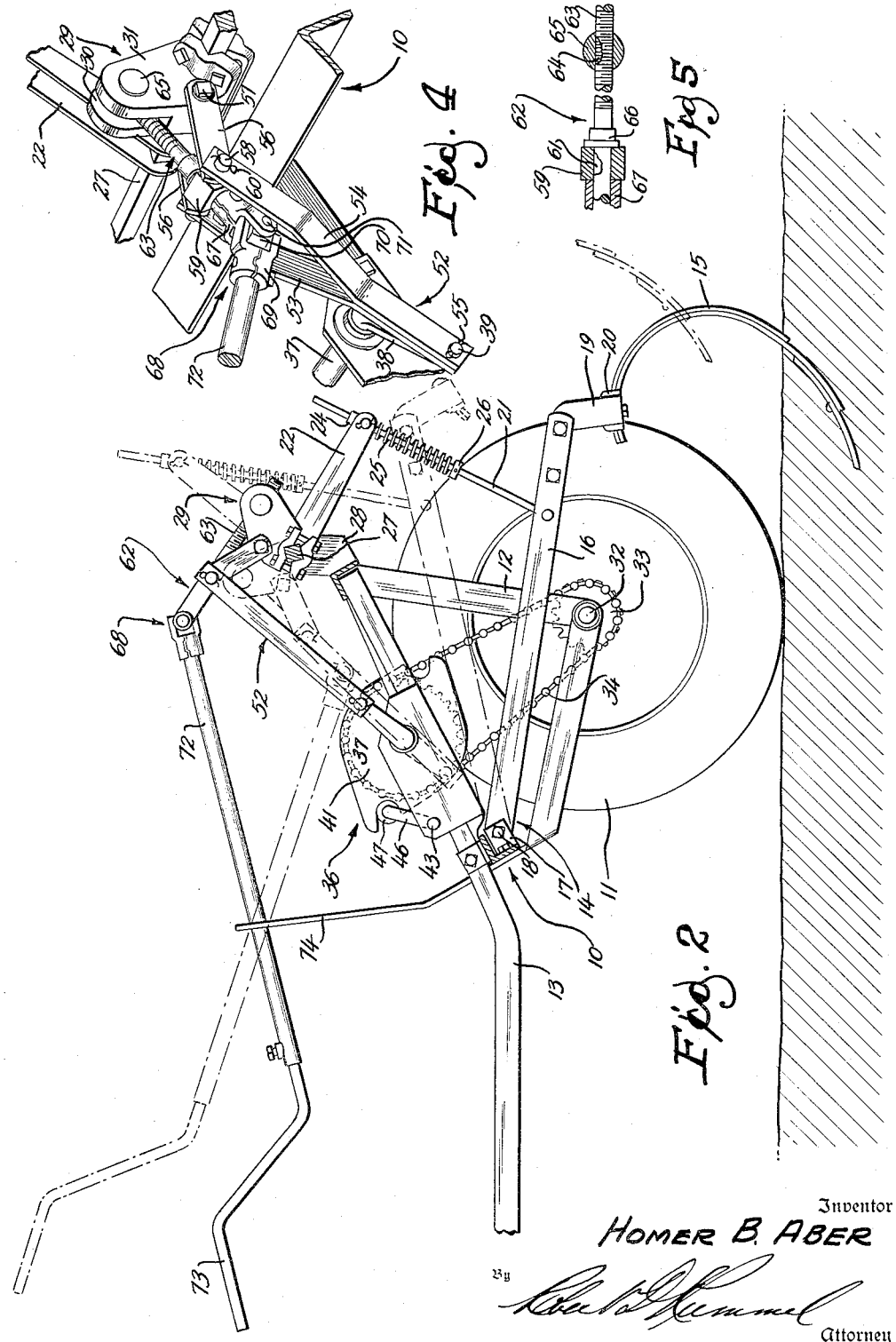

Patented June 5, 1956

2,748,680

POWER LIFTS

Homer B. Aber, Racine, Wis., assignor to J. I. Case Company, Racine, Wis., a corporation of Wisconsin Application March 28, 1951, Serial No. 218,021

6 Claims. (Cl. 97—46.11)

The present invention relates to power lift devices and particularly to such as are applicable to field tillers, and consists in improvements whereby the earth working tools may be simultaneously adjusted for shallow or deep penetration and elevated to a raised position above the surface of the earth regardless of the depth at which the tools have been set, and which elevating operation when the tools have been adjusted as desired is accomplished in a simple manner by tripping a power lift clutch under control of an operator.

An object of the invention therefore is to generally improve the construction and operation of devices of this class.

A further object is to provide such a device which is operable by an operator on a tractor or other suitable propelling means.

In the drawings:

Fig. 1 is a plan view of a field tiller embodying the present invention, with parts removed.

Fig. 2 is a left-side sectional view, taken on the line 2—2 of Fig. 1 and with parts removed, of the implement shown in Fig. 1, showing the cultivating shovels in a "down" position in full lines and in an "up" position in dotted lines, the shovels being adjusted for "deep" penetration.

Fig. 3 is a sectional view similar to Fig. 2, with parts removed, showing the cultivating shovels in a "down" position in full lines and in an "up" position in dotted lines, the cultivating shovels being adjusted for "shallow" penetration.

Fig. 4 is a left-front elevational view of certain mechanisms shown in Fig. 1, slightly enlarged.

Fig. 5 is a sectional detail, somewhat enlarged, of certain mechanism indicated in Fig. 4.

As seen in Fig. 1, the invention is embodied in a field tiller of any suitable or well-known form including in the present instance a transversely disposed rectangular frame generally designated as 10 movably supported in a forwardly and downwardly inclined position by wheels 11, only one of which is shown, rotatably carried with respect to the frame 10 by angular-shaped wheel hangers 12, the frame 10 being provided with a drawbar 13 by which the machine may be drawn by a tractor or other suitable propelling means. Suitable cultivator rigs 14 are pivotally connected forwardly to the frame 10 and carry earth working teeth or shovels 15 for well-known purposes, all of the above being of conventional or well-known construction, the present invention concerning itself with power actuated means for lifting the shovels to transport position, clear of the ground, and for introducing them into the ground predetermined distances, as will appear.

The cultivator rigs 14 comprise a plurality of conventional drawbars as 16 of different lengths, which are held in spaced relationship adjacent their forward ends. The drawbars all extend to the same width, as well known in the art, which is desirable for increasing the torsional rigidity of the rigs, and are pivotally connected to brackets as 17, which are mounted in equally spaced relationship along the forward member 17a of frame 10, by transverse bolts or the like 18. The rear ends of the drawbars converge and substantially vertical tool standards 19 are connected thereto. The shovels 15, preferably in the form of spring teeth in the present instance, are secured adjacent the ends of the standards 19 by means of tool clamps 20 of any suitable construction for positioning the shovels 15 in earth engaging relationship with respect to the ground.

The assembly including the drawbars 16, the standards 19 and the shovels 15 may be raised and lowered, pivoting about bolts 18 for cultivating at dfferent depths or for transportation, and for controlling the position of the same, a rod 21 is pivoted to each of the drawbars 16 or other convenient part on the assembly and connected to an arm 22 as by a slide block 23 pivoted to arm 22, the rod having a head 24 above the block, and a spring 25 acting between the slide-block and a collar 26 fixed on the rod to urge the latter, and accordingly the respective cultivator rig, to the lowered position determined by setting of the arm 22.

It will be apparent that upper positioning of the parts is determined positively by contact of head 24 with block 23 as well known in the art.

Arms 22 are fixed with a rockshaft 27 which is rotatably supported in spaced parallel relationship with the frame 10 by means of brackets 28, there being an arm for each individual cultivator rig, as previously suggested and as well known in the art.

A lift arm 29 having aligned spaced-apart arms 30 and 31 is fixed with the rockshaft 27 and controls the position thereof, and accordingly governs the action of cultivator rigs. Lift arm 29 is actuated by power as follows: An axle 32 which is rotated from wheel 11 drives, through a sprocket 33 or the like, a chain or flexible member 34, which extends to and actuates a movable member 35 of a half-revolution or cyclic clutch, generally designated 36, the clutch actuating a crank shaft 37 which has an arm 38, which operates through an adjusting mechanism connected between a pivot 39 of arm 38 and the lift arm 29 as will appear clearly hereinafter.

Sprocket 33 may be fixed in any suitable manner with axle 32 and chain 34 engages and drives a sprocket 40 fixed with or forming part of rotary member 35 of cyclic clutch 36, the rotary member being journaled on the crankshaft 37 and operating whenever the tiller is in motion. Member 35 may be drivingly connected with a normally stationary member 41 through internal mechanism of well-known type, not shown, member 41 being fixed with crankshaft 37 whereby the crankshaft is rotated with member 41 when the latter is engaged with rotary member 35. A trip arm 42 is fixed to a rotatable shaft 43 for swinging movement between substantially fore and aft extending brackets 44 and 45. One end of shaft 43 is provided with an arm 46 which has a roller 47 coacting with member 41 in the usual manner whereby, when trip arm 42 is pulled forward momentarily as by a rope or the like 48, member 41 will engage with member 35 for one-half revolution and automatically disengage, turning crankshaft 37 from the full line position to the dotted line position indicated in Fig. 2, and locking it against movement. Trip arm 42 is retracted by an suitable means such as a spring 49 anchored to some suitable portion of the frame.

Crankshaft 37 is carried in bearings 50 and 51 supported by brackets 44 and 45 and is positioned substantially parallel to shaft 43 and substantially normal to the direction of travel of the implement.

Figs. 2 and 3 show the cultivator rigs 14 in an operative and a non-operative position, the parts being shown in the "up" or transport position of the shovels in dotted lines, and in the "down" position in full lines, Fig. 2 showing the adjustment for deep cultivating and Fig. 3 that for shallow cultivating.

The adjusting mechanism includes in the present instance, a power link 52 which has rearwardly extending spaced apart arms 53 and 54, power link 52 being pivotally supported adjacent the forward end thereof on pivot 39 and retained thereon by a cotter pin or other suitable means 55. Control links 56—56, preferably formed of steel and extremely rugged compared to the cast iron yokes of prior constructions, are pivotally secured adjacent one end thereof on opposite sides of lift arm 29 by means of bolts or the like 57 and are pivotally connected adjacent the other ends thereof to trunnions 58 of a thrust block 59. The arms 53 and 54 are pivotally supported adjacent their rearward ends on opposite sides of the thrust block by means of trunnions 58 and the control links 56 and the arms 53 and 54 are secured against lateral displacement off trunnions 58 by conventional cotter pins or the like 60.

The thrust block 59 is provided with an opening 61 for reception of an adjusting screw 62. The adjusting screw 62 has a threaded portion 63 which is threadedly engaged in a threaded opening 64 formed in a trunnion 65 which in turn is rotatably carried between the lift arms 30 and 31 adjacent the ends thereof. The thrust block 59 is carried on the adjusting screw 62 between a thrust collar 66 formed on the screw 62 and a fork member 67 secured adjacent the forward end of screw 62 and forming a part of a universal joint, of any suitable or conventional construction designated as 68, to which is connected a forked member 69, the usual block 70, and pintles 71 being interposed between the forks. It will be appreciated that thrust collar 66 and fork member 67 prevent sliding movement of thrust block 59 on screw 62 and absorb the thrust exerted on block 59 by the rigs 14 and power link 52.

Fork 69 is connected to a shaft or rod 72 extending to any desired point such, for example, as the tractor drawing the machine, and it may be provided with a crank 73 or other suitable means for turning the rod. Rod 72 is suitably supported near the crank 73 by means of a suitable standard 74, the standard being carried by the frame 10.

As previously suggested, Figs. 2 and 3 show the parts when the shovels 15 are in raised or "up" position in dotted lines and in a working or "down" position in full lines, the parts being shown in adjustment for shallow cultivating in Fig. 3 and for deep penetration in Fig. 2. In moving the shovels from an "up" position to a "down" position, the clutch 36 is tripped in a manner as previously described so as to turn shaft 37 and consequently arm 38 one-half revolution. The power link 52 is, therefore, forced rearwardly by arm 38 a distance substantially equal to the diameter of the arc of travel of pivot 39 and through control links 56 and screw 62 the lift arm 29 and consequently rockshaft 27 and arms 22 are caused to rotate in a clockwise direction. Since the setting of arms 22 is determinative of the position of the shovels 15, the rigs 14 will be forced downwardly into a "down" position upon clockwise movement of arm 22 initiated on tripping of the clutch 36. Upon again tripping clutch 36, shaft 37 is turned another one-half revolution whereupon power link 52 is pulled forwardly which through control links 56 and screw 62 moves lift arm 29, rockshaft 27, and arms 22 counterclockwise a distance sufficient to return the rigs 14 and shovels 15 from a "down" position to an "up" position.

It will be appreciated that by turning crank 73 for moving trunnion 65 along the screw 62 so as to increase or decrease the distance between the thrust block 59 and trunnion 65, that lift arms 29 and accordingly rockshaft 27 and arm 22 will be swung in a clockwise or counterclockwise direction a distance depending upon the direction moved by trunnion 65 on screw 62. The movement initiated to lift arm 29, rockshaft 27, and arms 22 by moving trunnion 65 on screw 62 is independent of movement initiated to these elements by means of the clutch 36 and, as will be apparent, various positions of trunnion 65 on screw 62 will result in various depths of penetration of shovels 15 when the cultivator rigs 14 are moved into a "down" position. It will also be apparent that while the shovels can be adjusted from a "deep" penetration to a "shallow" peneration, that the range of adjustment of trunnion 65 on screw 62 is insufficient to lower the shovels sufficiently "deep" to prevent the raising of the shovels from the ground when the clutch 36 is tripped, nor to permit the shovels to be raised in an "up" position sufficiently to fail to permit the shovels when lowered into a "down" position by tripping of the clutch 36, to fail to enter the ground to some extent.

To prevent the operator from running the trunnion 65 off the screw 62, a stop 75 is threaded into the screw adjacent the rearward end thereof for abutting against the trunnion when the trunnion is moved on the screw sufficiently rearwardly. It will be appreciated that by providing a maximum predetermined distance between the thrust block 59 and trunnion 65 that the maximum depth of penertation of shovels 15 can be calculated so that when the shovels are raised to an "up" position, sufficient clearance will be allowed between the shovels and the ground. The length of the threaded portion of screw 62 determines the predetermined minimum distance between the thrust block 59 and the trunnion 62. When the forward movement of trunnion 65 towards the thrust block 59 is stopped at the end of the threaded portion of 63, the distance between the thrust block 59 and trunnion 65 is so calculated as to position the shovels 15, when the shovels are moved into a "down" position, to barely penetrate the ground.

Having now clearly described the invention what is claimed is:

1. In a power lift for an implement having a rockshaft, an actuating arm secured to the rockshaft to rock therewith a nut floatingly mounted on the arm spaced from the rockshaft, a range adjusting screw engaged with the nut and projecting transversely from said arm, a thrust block journaled on the screw spaced from the nut and constrained against movement axially on the screw, a pitman pivoted to said thrust block, a link pivoted to said arm adjacent said rockshaft and pivotally connected to said thrust block adjacent said pitman so as to guide it to move in an arcuate path about said rockshaft when said screw is adjusted, so as to alter the range through which said rockshaft will be rocked upon predetermined movement of said pitman, the force exerted by said pitman tending to rock said rockshaft being directed through said screw, earth working rigs adapted to be raised and lowered in response to rocking of said rockshaft, means for actuating said pitman through said predetermined movement, and means for adjusting said screw.

2. In a power lift for an implement having a rockshaft, earth working rigs adapted to be raised and lowered in response to rocking of said rockshaft and a pitman shiftable into a plurality of predetermined positions, an adjusting extension comprising an actuating arm secured with and projecting laterally from the rockshaft so as to rock therewith, a nut floatingly mounted on the arm spaced from the rockshaft, a range adjusting screw engaged with the nut and projecting transversely from the arm, a thrust block journaled on the screw spaced from the nut and constrained against movement axially on the screw, said thrust block being pivoted to said pitman, and a link pivotally secured in fixed relation to said rockshaft and pivotally connected to said thrust block adjacent said pitman so as to guide it to move in an arcuate path about said rockshaft when said screw is adjusted so as to alter the range through which said rockshaft will be rocked, the force exerted by said pitman tending to rock said rockshaft being directed through said screw.

3. In a power lift for an implement having a rockshaft, an actuating arm on the rockshaft secured thereto to rock therewith, a range adjusting screw projecting transversely from said arm, a nut means engaged with the screw and a thrust block means journaled on the screw spaced from the nut means and constrained against movement axially on the screw, one of said means being floatingly mounted on the arm spaced from the rockshaft, a pitman shiftable into a plurality of predetermined positions and pivotally connected to the other of said means, a link pivoted to the other of said means adjacent said pitman, so as to guide it to move in an arcuate path about said rockshaft when said screw is adjusted so as to alter the range through which said rockshaft will be rocked upon predetermined movement of said pitman, the force exerted by said pitman tending to rock said rockshaft being directed through said screw, earthworking rigs adapted to be raised and lowered in response to rocking of said rockshaft, means for actuating said pitman through said predetermined movement, and means for adjusting said screw.

4. In a power lift for an implement having a rockshaft, earth working rigs adapted to be raised and lowered in response to rocking of said rockshaft and a pitman shiftable into a plurality of predetermined positions, an adjustable extension comprising an actuating arm projecting laterally from the rockshaft and secured thereto to rock therewith, a range adjusting screw projecting transversely from said arm, a nut means engaged with the screw and a thrust block means journaled on the screw spaced from the nut means and constrained against movement axially on the screw, one of said means being floatingly mounted on the arm spaced from said rockshaft, and the other of said means being pivoted to said pitman, and a link pivotally secured in fixed relation to said rockshaft and pivotally connected to the other of said means adjacent said pitman so as to guide it to move in an arcuate path about said rockshaft when said screw is adjusted so as to alter the range through which said rockshaft will be rocked, the force exerted by said pitman tending to rock said rockshaft being directed through said screw.

5. In a power lift for an implement having a rockshaft, an actuating arm secured to the rockshaft to rock therewith, a nut floatingly mounted on the arm spaced from the rockshaft, a range adjusting screw engaged with the nut and projecting transversely from said arm, a thrust block journaled on the screw spaced from the nut and constrained against movement axially on the screw, a pitman pivoted to said thrust block, a link pivoted to said arm adjacent said rockshaft and pivotally connected to said thrust block adjacent said pitman so as to guide it to move in an arcuate path about said rockshaft when said screw is adjusted, so as to alter the range through which said rockshaft will be rocked upon predetermined movement of said pitman, the force exerted by said pitman tending to rock said rockshaft being directed through said screw, a stop adjacent the end of said screw for abutting said nut for preventing movement of said nut on said screw in one direction beyond a predetermined limit, earth working rigs adapted to be raised and lowered in response to rocking of said rockshaft, means for actuating said pitman through said predetermined movement, and means for adjusting said screw.

6. In a power lift for an implement having a rockshaft, earth working rigs adapted to be raised and lowered in response to rocking of said rockshaft and a pitman shiftable into a plurality of predetermined positions, an adjusting extension comprising an actuating arm projecting laterally from the rockshaft and secured thereto to rock therewith, a nut floatingly mounted on the arm spaced from the rockshaft, a range adjusting screw engaged with the nut and projecting transversely from the arm, a thrust block journaled on the screw spaced from the nut and constrained to movement axially with the screw said thrust block being pivoted to said pitman, a link pivotally secured in fixed relation to said rockshaft and pivotally connected to said thrust block adjacent said pitman so as to guide it to move in an arcuate path about said rockshaft when said screw is adjusted so as to alter the range through which said rockshaft will be rocked, the force exerted by said pitman tending to rock said rockshaft being directed through said screw, and a stop adjacent the end of said screw for abutting said nut for preventing movement of said nut on said screw in one direction beyond a predetermined limit.

References Cited in the file of this patent

UNITED STATES PATENTS

| | | |
|---|---|---|
| 1,533,059 | Cady | Apr. 7, 1925 |
| 2,337,773 | Scarlett et al. | Dec. 28, 1943 |
| 2,352,589 | Scarlett et al. | June 27, 1944 |
| 2,385,935 | Oerman | Oct. 2, 1945 |
| 2,426,354 | Johnston | Aug. 26, 1947 |
| 2,454,482 | Rutter | Nov. 23, 1948 |
| 2,524,205 | Orelind | Oct. 3, 1950 |